United States Patent
Hara et al.

(10) Patent No.: US 9,225,547 B2
(45) Date of Patent: Dec. 29, 2015

(54) APPARATUS, METHOD, AND MEDIUM FOR CONTROLLING TRANSMISSION OF DATA

(75) Inventors: Yuji Hara, Machida (JP); Hisashi Ishikawa, Urayasu (JP); Akinobu Mori, Kawasaki (JP); Takeo Kimura, Yokohama (JP); Hirowo Inoue, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1044 days.

(21) Appl. No.: 12/724,314

(22) Filed: Mar. 15, 2010

(65) Prior Publication Data
US 2010/0241826 A1     Sep. 23, 2010

(30) Foreign Application Priority Data

Mar. 17, 2009  (JP) ................ 2009-064683
Sep. 29, 2009  (JP) ................ 2009-224834

(51) Int. Cl.
*G06F 9/30*     (2006.01)
*H04L 12/437*   (2006.01)
*G06F 15/173*   (2006.01)
*G06T 1/20*     (2006.01)

(52) U.S. Cl.
CPC ........ *H04L 12/437* (2013.01); *G06F 15/17381* (2013.01); *G06T 1/20* (2013.01)

(58) Field of Classification Search
None
See application file for complete search history.

(56) References Cited

U.S. PATENT DOCUMENTS

| 5,666,484 A | 9/1997 | Orimo |
| 5,963,746 A * | 10/1999 | Barker et al. ................... 712/20 |
| 2003/0196076 A1 * | 10/2003 | Zabarski et al. ............... 712/234 |

FOREIGN PATENT DOCUMENTS

| JP | 61-187445 A | 8/1986 |
| JP | 02-283142 A | 11/1990 |
| JP | 03-067350 A | 3/1991 |
| JP | 08-180031 A | 7/1996 |
| JP | 2522952 B2 | 8/1996 |
| JP | 09-091262 A | 4/1997 |
| JP | 2734246 B2 | 3/1998 |
| JP | 2834210 B2 | 12/1998 |

\* cited by examiner

*Primary Examiner* — William B Partridge
(74) *Attorney, Agent, or Firm* — Canon USA Inc. IP Division

(57) ABSTRACT

A data processing apparatus can reduce an occupancy rate of a ring bus by suppressing occurrence of a stall packet, and can change a processing sequence. In the data processing apparatus, a buffer is provided in each communication unit connecting the ring bus and the associated processing unit. Transfer of data from the communication unit to the processing unit is controlled by an enable signal. Consequently, occurrence of a stall packet is suppressed. Accordingly, frequency of occurrence of a deadlock state is reduced by decreasing the occupancy rate of the ring bus.

14 Claims, 12 Drawing Sheets

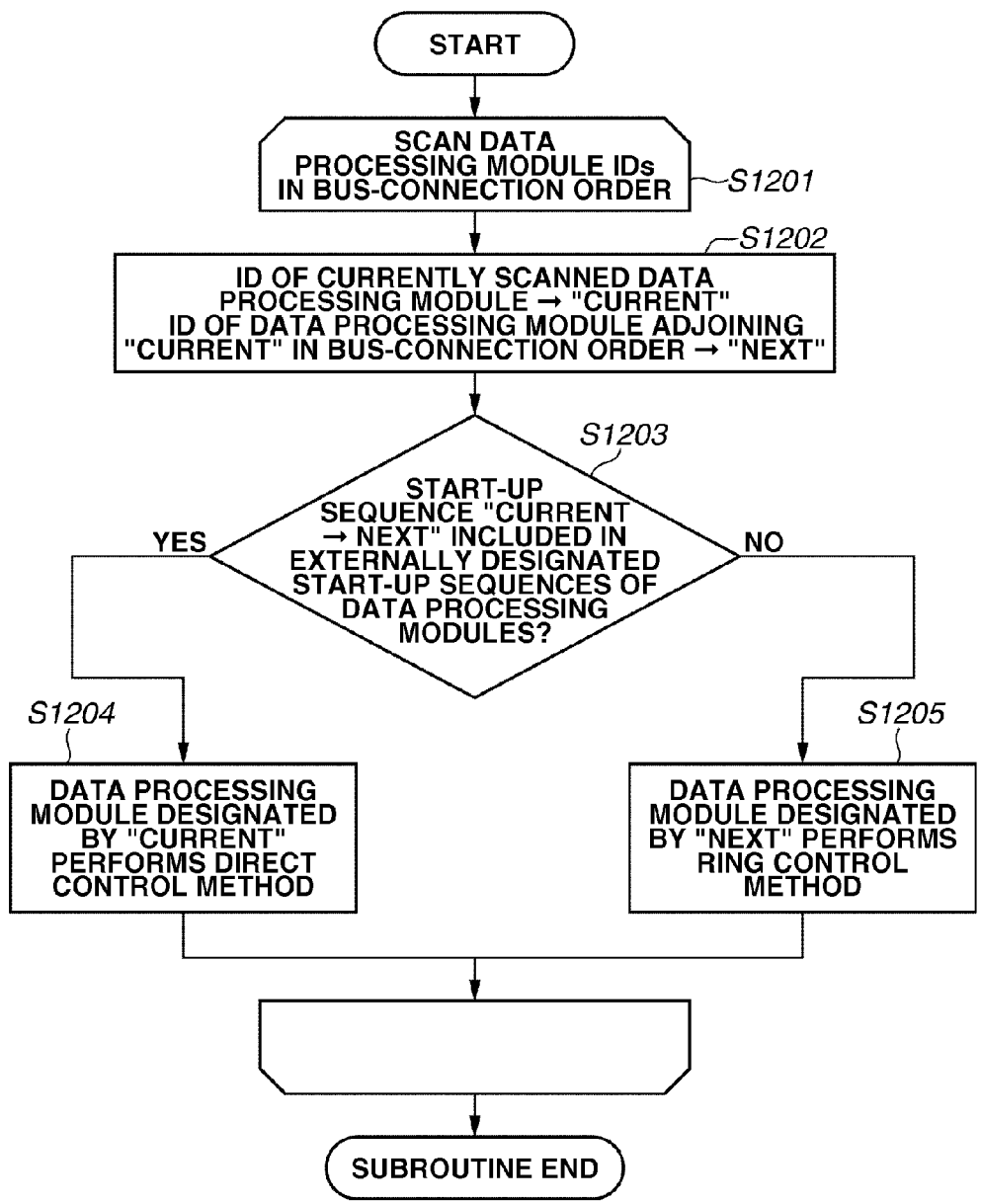

APPARATUS, METHOD, AND MEDIUM FOR CONTROLLING TRANSMISSION OF DATA

BACKGROUND OF THE INVENTION

1. Field of the Invention

The present invention generally relates to data processing and, more particularly, to a data processing apparatus whose plurality of processing units are connected to a ring-shaped bus, a data processing method for use therewith, and a program.

2. Description of the Related Art

Japanese Patent No. 2734246 discusses a conventional method for dividing (grouping), in order to implement high-speed pipeline processing, a sequence of data processing-operations to be performed as pipeline processing into groups, allocating the groups to a plurality of modules, respectively, and connecting the plurality of modules with a bus in the order of processing flow.

However, when a processing order in which processing-operations A, B and C of pipeline processing are performed by the modules (it is assumed that the processing-operations A, B, and C are assigned to the modules without overlap) is changed from A→B→C to A→C→B, it is difficult to change the processing order of the modules connected with a physical bus in such a manner.

Image processing can efficiently be implemented, as follows, by changing the processing order in which a series of processing-operations is performed. For example, when an image is output to an output apparatus, if the number of pixels of an input image is larger than that of pixels of an image output to the output apparatus, it is efficient to perform the processing after the number of pixels of an image to be processed is reduced in an upstream step as close as possible to a start of the processing. On the other hand, if the number of pixels of an input image is smaller than that of pixels of an image output to the output apparatus, it is advisable that the processing is performed in a state, in which the number of pixels of an image to be processed is small, without performing a resolution conversion and that the number of pixels of the image to be processed is increased by a resolution conversion in a downstream step just before an output of the image.

In a case where processing is performed on an input image by converting a certain space such as an input device space into a standard space such as a Commission Internationale de l'Eclairage L*a*b* (CIELAB) color space and where after the processing, the standard space is converted into another space such as an output device space to obtain an output image, a processing order, in which processing-operations such as a one-dimensional look-up table (LUT), a matrix operation, and a three-dimensional LUT, are performed by a space conversion unit at an output side, is reverse to that in which the processing-operations are performed by a space conversion unit at an input side. More specifically, if the processing order can be changed, the same processing modules can be shared by the space conversion units respectively provided at the input side and the output side.

Japanese Patent Nos. 2522952 and 2834210 discuss methods for making the processing order as variable by connecting processing circuits with a ring-shaped bus (hereinafter referred to simply as a "ring bus").

However, in a plurality of processing circuits that are connected to a ring bus as hardware and have a fixed processing function, it is difficult to suppress an increase in amount of traffic of the ring bus without stagnating a flow of packets flowing through the ring bus.

SUMMARY OF THE INVENTION

The present invention is directed to suppressing, in a plurality of processing circuits that are connected to a ring bus as hardware and have a fixed processing function, an increase in amount of traffic of the ring bus without stagnating a flow of packets flowing through the ring bus.

According to an aspect of the present invention, in a data processing apparatus in which a plurality of processing modules is connected in a ring via a bus and transfers data in a predetermined transfer direction along the ring to perform processing on the data, each of the processing modules includes a communication unit configured to receive data via the bus in a first direction along the ring and to transmit the received data in a second direction, and a processing unit connected one-to-one to the communication unit and configured to perform processing on data received from the communication unit of the same processing module. The communication unit controls transmission of data by the processing unit in response to an enable signal from the communication unit, which is located in the second direction along the ring.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 12 partly illustrates an initialization process to be performed by the control unit of the data processing apparatus according to the exemplary embodiment of the present invention.

DESCRIPTION OF THE EMBODIMENTS

Various exemplary embodiments, features, and aspects of the invention will be described in detail below with reference to the drawings.

First, when processing modules are connected with a ring-shaped network (hereinafter referred to as a ring bus) and a series of processing-operations are performed by a plurality of processing units in sequence, an increase in amount of traffic of the ring bus is described as an example.

Figure 1:
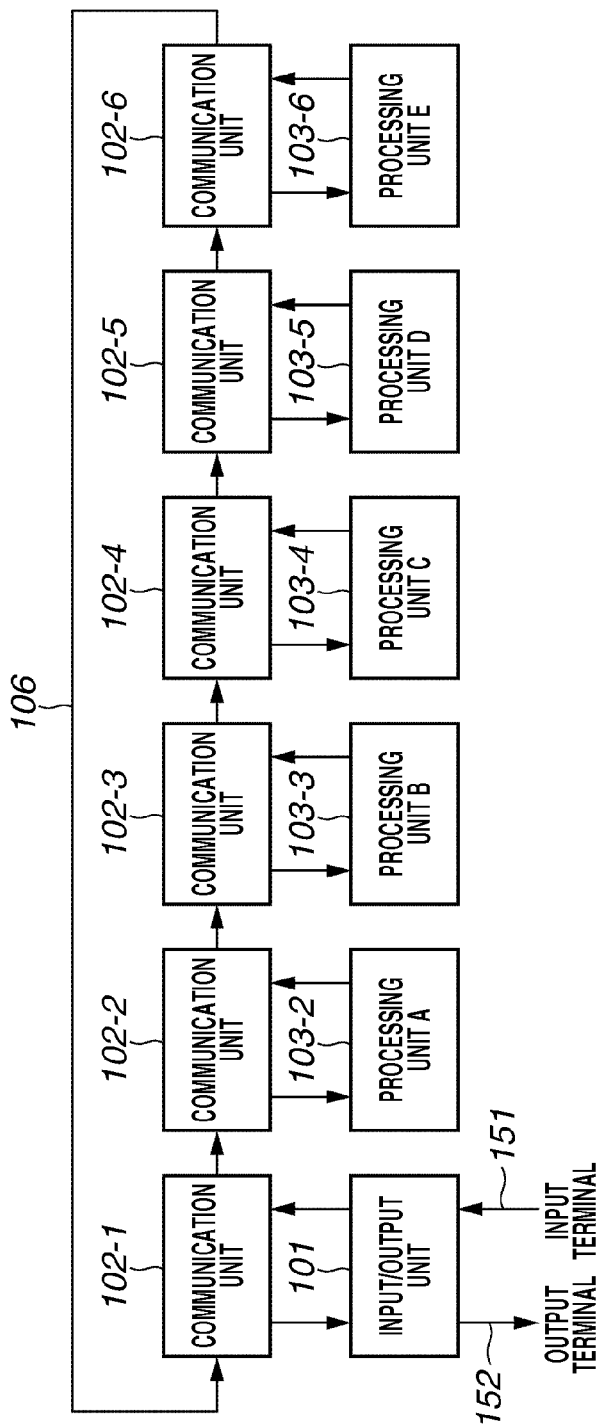
FIG. 1 illustrates a reference example of a configuration of a data processing apparatus.

FIG. 1 is a block diagram schematically illustrating a configuration of a reference example of a data processing apparatus in which the processing modules are connected in a ring with a ring bus. The processing modules include a data input/output unit 101, communication units 102-1 through 102-6, and data processing units 103-2 through 103-6 provided corresponding one-to-one to the communication units 102-1 through 102-6.

Each of the communication units 102-1 through 102-6 is connected to the communication units adjacent thereto (the communication unit 102-6 is connected to the communication unit 102-1). Each communication unit transmits data, which is received from a specific direction (first direction), as a part of the ring bus 106, towards another direction (second direction). More specifically, the communication units 102-1 through 102-6 constitute the ring bus 106 and transmit and receive data to and from the ring bus 106 and the data input/output unit 101 (or each of the data processing units 103-2 through 103-6). The communication units 102-2 through 102-6 (hereinafter sometimes generically referred to as the communication unit 102) are connected to the data processing units 103-2 through 103-6 (hereinafter sometimes generically referred to as the data processing unit 103), respectively.

Data input from an input terminal 151 is input to the communication unit 102-1 via the data input/output unit 101. The input data is packetized and flows through the ring bus (or the ring) in a direction. The communication unit 102 receives a necessary packet based on preset information from the ring bus 106. Then, the communication unit 102 extracts data from the received packet. If the extracted data can be processed by the data processing unit 103, the communication unit 102 inputs the extracted data to the data processing unit 103. Then, the data processing unit 103 performs predetermined data processing (e.g., a color space conversion, and a resolution conversion) and outputs the processed data to the communication unit 102. If the processed data can be output to the ring bus 106, the communication unit 102 packetizes the processed data and causes the packetized data to flow into the ring bus 106. Thus, the data is received by the communication units 102-2 through 102-6 and processed by the data processing units 103-2 through 103-6 in the preset order. Then, the data, the preset processing of which is completed, is received from the data communication unit 102-1 into the data input/output unit 101 and output to an output terminal 152.

Figure 2:
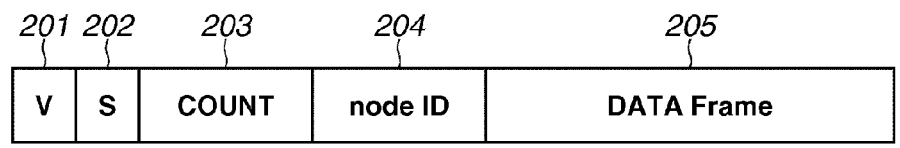
FIG. 2 schematically illustrates a format of a packet flowing through a ring bus of the data processing apparatus illustrated in FIG. 1.

FIG. 2 illustrates a data structure of a packet flowing through the ring bus 106. A valid flag (V) 201 indicates that the packet is valid. A stall flag (S) 202 indicates that a packet is in a reception pending state (i.e., a stall state). A count value (COUNT) 203 indicates an ordinal number of data to be transmitted, which represents a position of the data in a transmission sequence. A node identification number (node ID) 204 represents a connection identifier (ID) for identifying a logical connection of data. Data (DATA Frame) 205 represents data to be input to or output from the communication unit 102.

The communication unit 102 analyzes a packet propagated through the ring bus 106. In a case where the valid flag 201 indicates that the packet is valid, where the ID 204 and the count value 203 are respectively matched with values managed in the communication unit 102, and where a processing module connected directly to the communication unit 102 can process the data, the communication unit 102 sends the data to the processing module. Simultaneously, the communication unit 102 transmits a packet (hereinafter referred to simply as an empty packet), whose valid flag is invalidated, through the ring bus 106 to the processing module connected downstream (subsequently) to the communication unit 102.

On the other hand, when as a result of analyzing a packet propagated through the ring bus 106, the valid flag 201 indicates that the packet is valid, the ID 204 and the count value 203 are respectively matched with values managed in the communication unit 102, and a processing module connected directly to the communication unit 102 cannot process the data, the communication unit 102 transmits a packet (hereinafter referred to as a stall packet), whose stall flag is validated, to another communication unit 102 of a subsequent stage connected thereto with the ring bus 106. Similarly, even in a case where the valid flag 203 indicates that the packet is valid, where the ID 204 is matched with the value managed in the communication unit 102, and where the count value 203 is not matched with the value managed in the communication unit 102, the communication unit 102 transmits a stall packet to another communication unit 102 of the subsequent stage connected thereto via the ring bus 106.

When a result of analyzing a packet propagated through the ring bus 106 shows that the valid flag 201 indicates that the packet is valid, and the ID 204 corresponding to the data is not matched with a value managed in the communication unit 102, the communication unit 102 transmits a packet without change.

The above control operation enables a change of the order in which processing-operations are performed in the data processing apparatus in which each of a plurality of processing modules is connected to the ring bus 106 via the communication unit 102 thereof.

Hereinafter, an example of a case of increasing the number of output data so as to be larger than that of input data by, e.g., enlargement processing performed by one of the processing modules is described. As a result of the increase of the number of output data, it is difficult for the processing module to receive data every clock cycle and to continue to process the data. Thus, the processing module discharges a large number of stall packets to the ring bus. In this case, the number of stall packets on the ring bus increases, so that an occupancy rate of the bus can be increased, and that a deadlock state (i.e., a state in which the ring bus is filled with valid data, so that processing cannot proceed) can be caused.

Alternatively, another method can be assumed in which an additional bus is prepared in addition to the ring bus and communications relating to processing that frequently generates stall packets are performed using the additional bus. However, this method cannot fundamentally solve the above problems. In addition, selectors for selectively inputting data to each processing module from the ring bus and the additional bus are needed, the number of which is obtained by multiplying a bit width of the bus by the number of the processing modules. This results in increase of a circuit size.

Japanese Patent No. 2522952 discusses a method for preventing occurrence of a deadlock state by connecting a firstin-first-out (FIFO) memory between each pair of adjacent processing modules provided on a ring bus, causing, when the processing module cannot output data to the ring bus, the processing module to output a conflict signal to the FIFO memory. Thus, reading of data from the FIFO memory (i.e., saving the stall packet to the FIFO memory) is inhibited, thereby generating a free part on the ring bus. However, e.g., when both of a change of the processing order and the enlargement processing are simultaneously performed, if the FIFO memory is fully filled with the stall packets, other stall packets can overflow to the ring bus. Thus, the above problems cannot fundamentally be solved only by preparing the FIFO memory.

As described above, the processing module currently performing processing can inform another processing module of the stall state of a packet using the stall packets without stagnating a flow of packets flowing through the ring bus. Thus, the latter processing module can adjust traffic. However, when the number of stall packets increases, the stall packets occupy the ring bus at a high occupancy rate. Thus, a deadlock state can be caused.

Next, a first exemplary embodiment of the present invention is described.

Each composing element of the first exemplary embodiment, which has the same function as that of an associated composing element of the reference example, is designated with the same reference numeral. Description of composing elements of the first exemplary embodiment, which are substantially the same in constitution and function as those of the reference example, is omitted.

Figure 10:
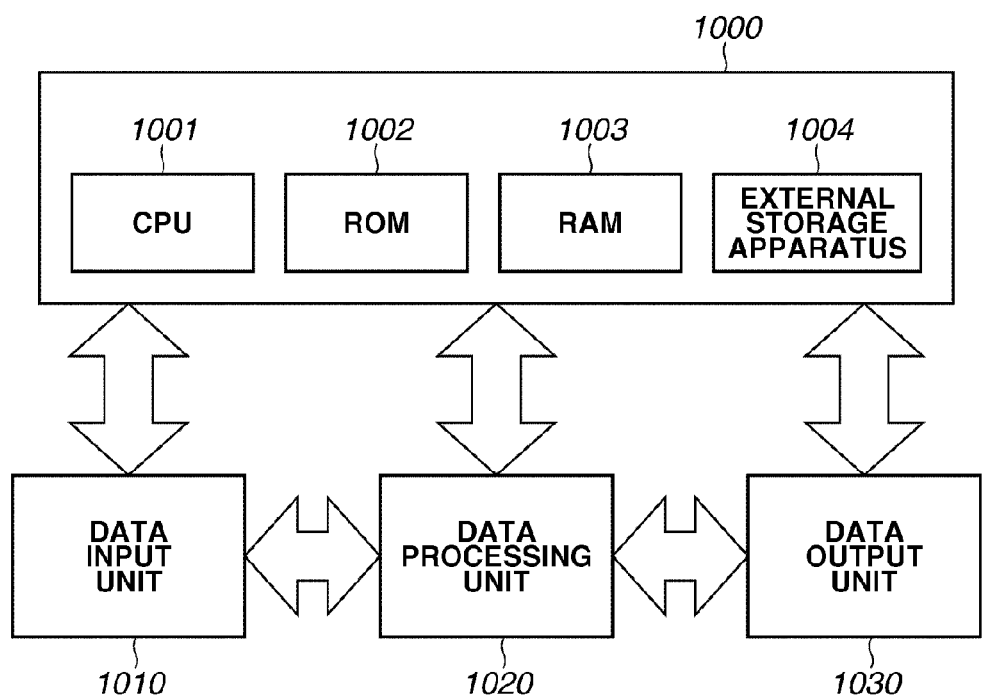
FIG. 10 illustrates an example of a configuration of a data processing apparatus according to an exemplary embodiment of the present invention.

FIG. 10 illustrates a configuration of a data processing apparatus according to the first exemplary embodiment of the present invention. A control unit 1000 includes a central processing unit (CPU) 1001 for arithmetic control, a read-only memory (ROM) 1002 for storing fixed data and programs, a random access memory (RAM) 1003 for use in temporarily storing data and loading programs, and an external storage apparatus 1004 for storing external data.

A data input unit 1010 receives data to be processed. The data input unit 1010 can be, e.g., an image reading unit (including devices such as an image scanner and an analog-to-digital (A/D) converter), a voice input unit itself (including devices such as a microphone and an A/D converter), or a receiving unit for acquiring data from an input device.

Figure 6:
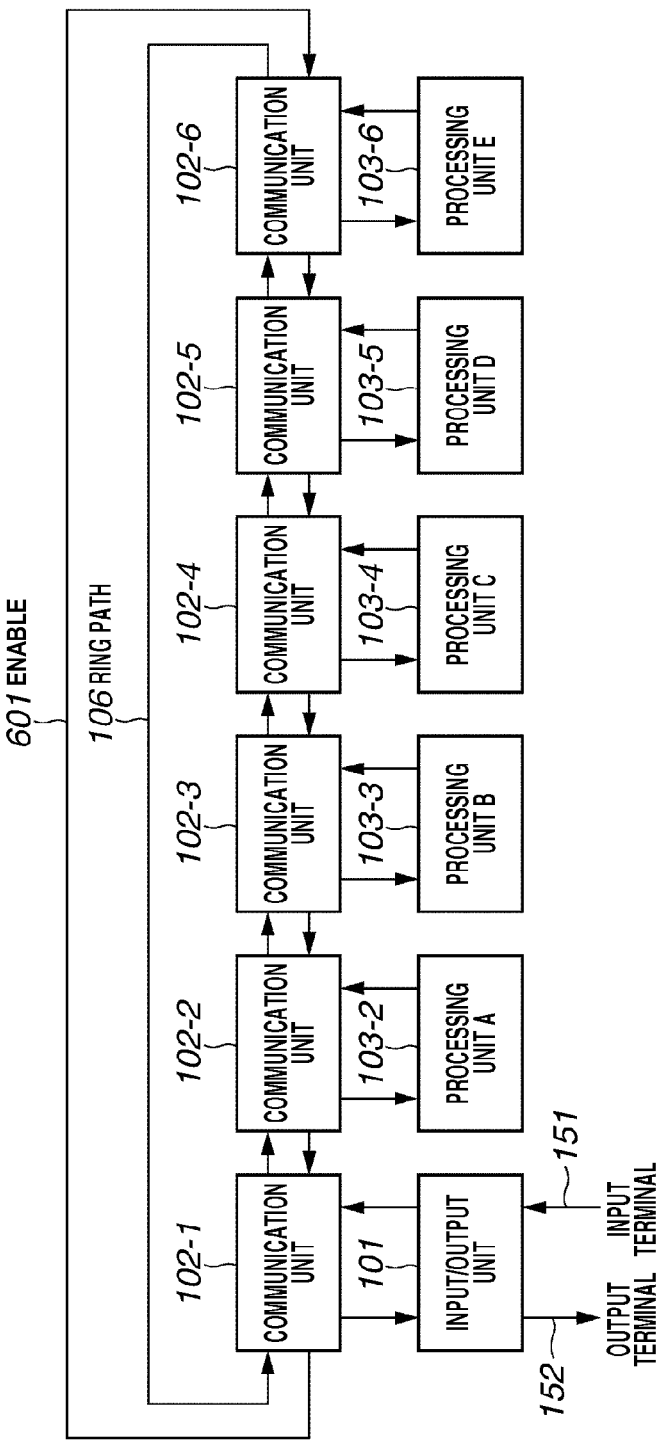
FIG. 6 schematically illustrates a configuration of a data processing unit having a ring bus according to an exemplary embodiment of the present invention.

An image processing unit 1020 is a data processing unit for performing parallel processing using a plurality of processing modules illustrated in FIG. 6. This processing unit is applied to processing of data which is not limited to an image and which is suitable for undergoing a sequence of data processing-operations, such as pipeline processing. Therefore, in FIG. 10, the image processing unit 1020 is described as a data processing unit.

A data output unit 1030 outputs processed data externally. The data output unit 1030 can be, e.g., an image output unit (including a printer device for converting image data into a print dot pattern and outputting the converted data) or a voice output unit for outputting voice data through a digital-to-analog converter). The data output unit 1030 can be an interface for simply transmitting data to an external device.

Data input at the data input unit 1010 can be received by the control unit 1000 and processed by the CPU 1001. Alternatively, the data input at the data input unit 1010 can temporarily be stored in the RAM 1003 or the external storage apparatus 1004 without being changed. The data processing unit 1020 can receive input data directly from the data input unit 1010 and perform processing on the received data. Alternatively, the data processing unit 1020 can perform processing according to an instruction and data supplied from the control unit 1000.

An output of the data processing unit 1020 can be sent to the control unit again. Alternatively, the output of the data processing unit 1020 can be sent directly to the data output unit 1030.

The control unit 1000 preliminarily sets what to be performed in each of data processing-operations by the data processing unit 1020. The data processing unit 1020 operates to perform the set data processing-operations on data supplied thereto. FIG. 6 is a block diagram illustrating a configuration of a plurality of processing modules of the data processing apparatus according to the present embodiment. In addition to the configuration illustrated in FIG. 1, the communication units are connected with an enable signal line 601 for transmitting a data transfer enable signal (hereinafter referred to simply as an enable signal) in a direction opposite to a direction (hereinafter referred to as a data transfer direction) in which data flows on the ring bus 106. The format of a packet flowing through the ring bus 106 is set as illustrated in FIG. 2.

The data input/output unit 101 serves as an interface to an external device (or module). When the data processing apparatus can directly be interfaced to an external device by the communication unit 102-1, the data input/output unit 101 can be omitted. The data input/output unit 101 serves as both of an input unit and an output unit. However, the data processing apparatus can be configured such that an input unit and an output unit are connected to different communication units provided on the ring bus, and that a plurality of input units and a plurality of output units are provided in the data processing apparatus.

Figure 3:
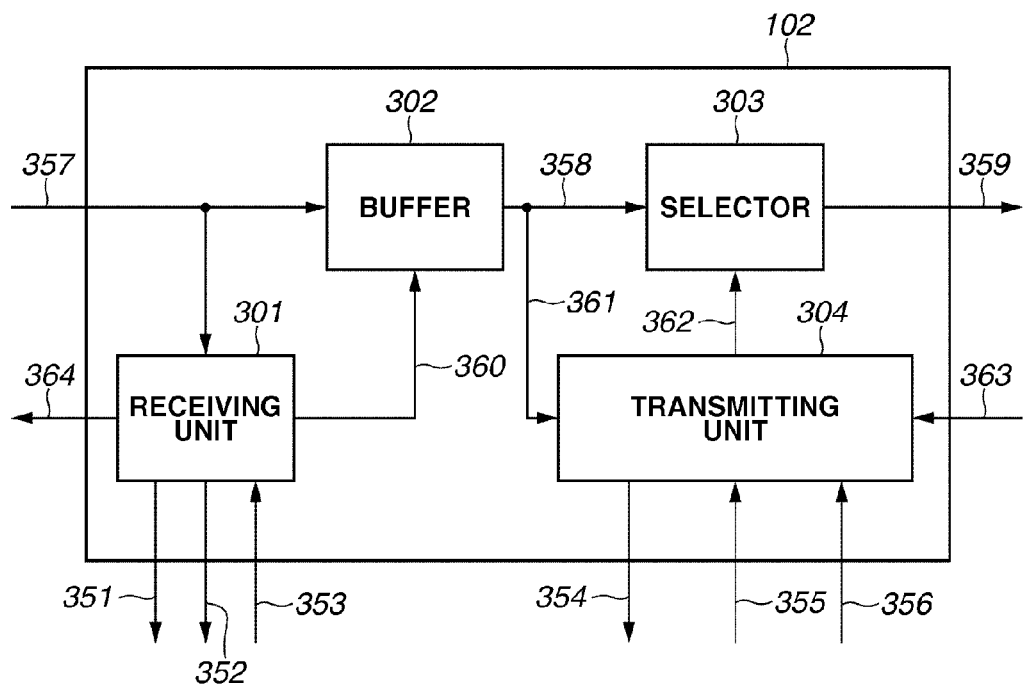
FIG. 3 schematically illustrates a configuration of a communication unit of a data processing apparatus according to an exemplary embodiment of the present invention.

FIG. 3 is a block diagram schematically illustrating a configuration of each communication unit 102. As illustrated in FIG. 3, each communication unit 102 includes a data receiving unit 301, a buffer 302, a selector 303, and a data transmitting unit 304.

An output terminal 359 is connected to an input terminal 357 of an adjacent communication unit (provided at a downstream side in a data transfer direction, i.e., provided in a second direction). Thus, the ring bus 106 includes communication units 102-1 through 102-6. An enable signal output terminal 364 to be connected to another adjacent communication unit (provided at an upstream side in the data transfer direction, i.e., provided in a first direction) is connected to an input terminal 363 (at the downstream side in a data transfer direction (more specifically, a direction of transfer of an enable signal)) of this adjacent communication unit. Each enable signal line provided between an associated pair of adjacent communication units 102-1 through 102-6 belongs to the enable signal line 601 in FIG. 6.

Each data processing unit 103 (one of data processing units 103-2 through 103-$m$ ("m" is an integer between 2 and 6)) is connected to signal lines 351, 352, 353, 354, 355, and 356. A packet input from the adjacent communication unit (provided at the upstream side in the data transfer direction) is temporarily stored in the buffer 302 and output to the selector 303 in the next clock cycle.

The data receiving unit 301 monitors a packet sent from the input terminal 357 and determines whether the valid flag 201 indicates that the packet is valid, and whether the ID 204 and the count value 203 are matched with values stored by the data receiving unit 301, respectively. When data can be input to the data processing unit 103 connected to the data receiving unit 301 (i.e., a stall signal on the signal line 353 does not represent a pending state), the data receiving unit 301 receives a packet that satisfies the above conditions. At that time, the data receiving unit 301 puts a valid signal on the signal line 351 into a valid state, and outputs data to the data processing unit 103 from the output terminal 352.

Then, the receiving unit 301 informs the buffer 302 via the signal line 360 that the data processing unit 103 receives data. In addition, the data receiving unit 301 invalidates a packet, which is to be stored in the buffer 302, by clearing the valid flag of the packet. After data receiving unit 301 receives data contained in the packet, the count value associated with the data is incremented. At that time, if an enable (signal) mask register (hereinafter referred to simply as a mask register) 407, which is described below and illustrated in FIG. 4, stores a value indicating that the packet is invalid, the data receiving unit 301 validates an enable signal at the output terminal 364 and outputs the enable signal.

When a value indicated by the mask register 407 indicates an invalid state, in a case where the valid flag of an input packet indicates that the packet is valid, where the connection ID and the count value are matched with the values stored by the receiving unit 301, respectively, and where data cannot be input to the data processing unit 103 connected to the receiving unit 301 (i.e., a stall signal on the signal line 353 represents a pending state), the data is stored in an inner buffer of the data receiving unit 301. Simultaneously, the data receiving unit 301 informs the buffer 302 of the reception of the data. The data receiving unit 301 clears the valid flag of the packet to invalidate the packet.

On the other hand, when the value indicated by the mask register 407 represents a valid state, in a case where the valid flag of an input packet indicates that the packet is valid, where the connection ID and the count value are matched with the values stored by the receiving unit 301, respectively, and where a stall signal on the signal line 353 represents a pending state, the data receiving unit 301 informs the buffer 302 of the pending state of data via the signal line 360 and sets a stall flag of the packet to be stored in the buffer 302. In a case where the valid flag of the input packet represents a valid state, and where the connection ID is matched with the value stored by the receiving unit 301, however, the count value is not matched with the value stored by the receiving unit 301, data cannot be received by the receiving unit 301. Thus, in this case, the receiving unit 301 sets the stall flag.

The data transmitting unit 304 monitors, via a signal line 361, the valid flag of a packet output from the buffer 302 (to a signal line 358). When the valid flag indicates that the packet is valid, the transmitting unit 304 cannot output data to the buffer 302 which outputs an output packet. Thus, the transmitting unit 304 sets a stall signal on the signal line 354 to suspend an output of data from the data processing unit 103. Similarly, when an enable signal input from the input terminal 363 is invalid, the transmitting unit 304 sets a stall signal on the signal line 354. In a case where an enable signal input from the input terminal 363 is valid, and where the valid flag of an output packet of the buffer 302 indicates that the packet is invalid, the transmitting unit 304 resets the stall signal on the signal line 354.

When the data processing unit 103 can output data (i.e., a valid signal on the signal line 356 indicates a valid state), if the valid flag of an output packet of the buffer 302 indicates that the packet is invalid, and an enable signal input from the input terminal 363 indicates a valid state, the data transmitting unit 304 validates the valid flag. In addition, the data transmitting unit 304 invalidates the stall flag. Then, the data transmitting unit 304 generates a packet by adding a count value and a connection ID to the flags, and controls the selector 303 to flow a packet into the ring bus 106 from the output terminal 359. Although it has been described that the data transmitting unit 304 generates a packet, this expression conceptually means that data is stored in an empty packet flowing through the ring bus 106. The count value is incremented after the packet is output therefrom.

Figure 4:
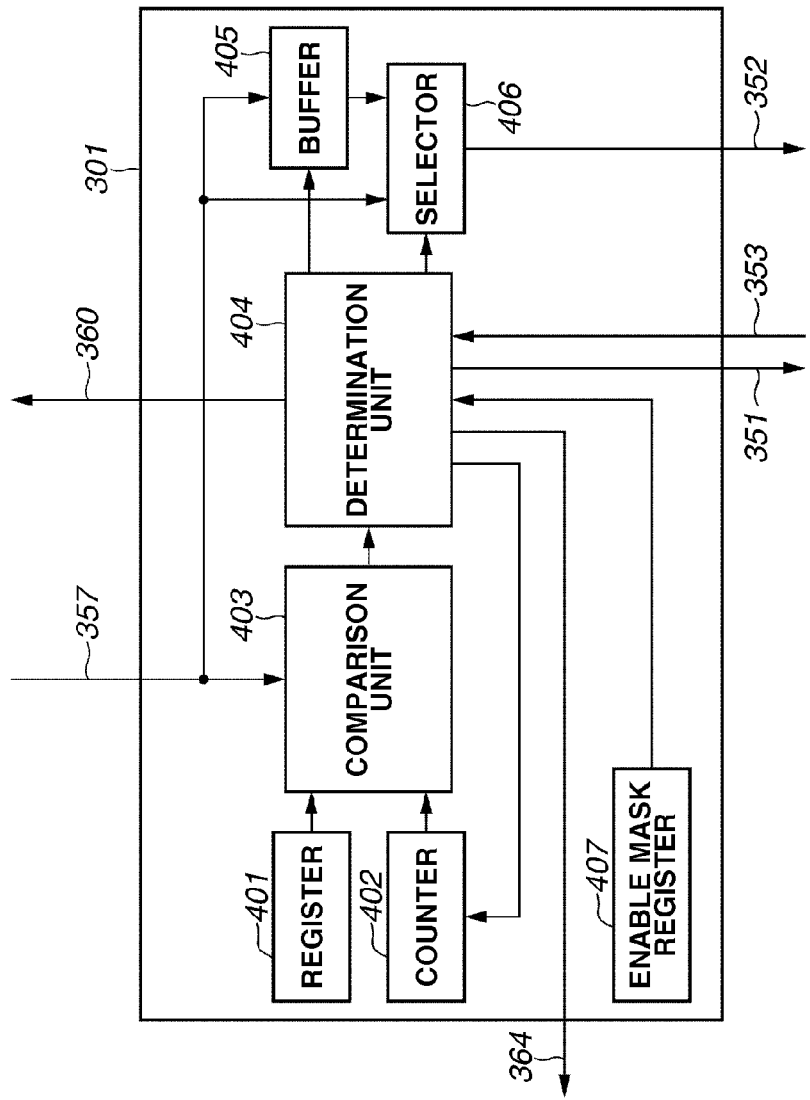
FIG. 4 schematically illustrates a data receiving unit of the communication unit illustrated in FIG. 3.

FIG. 4 is a block diagram schematically illustrating a configuration of the data receiving unit 301. As illustrated in FIG. 4, the data receiving unit 301 includes a register (storage unit) 401, a counter 402, a comparison unit 403, a determination unit (switching unit) 404, a buffer 405, a selector 406, and a mask register (setting unit) 407 for an enable signal.

First, an operation to be performed by the apparatus when a value of the mask register 407 indicates a valid state is described. The comparison unit 403 monitors the valid flag 201, the connection ID 204, and the count value of a packet on the ring bus 106, which is input from the input terminal 357. When the valid flag of the input packet indicates the packet is valid, the comparison unit 403 determines by comparison whether the connection ID of the packet is matched with that stored in the register 401 and further whether the count value of the packet is matched with the value of the counter 402. After the comparison, the comparison unit 403 outputs an input packet determination signal to the determination unit 404 when the connection ID is matched therewith. When the count value is matched with the value stored in the counter 402, the comparison unit 403 outputs a count value match signal to the determination unit 404.

In a state in which the buffer 405 is empty, if the input packet determination signal and the count value match signal are valid and where a stall signal set via the signal line 353 from the data processing unit 103 connected thereto indicates an invalid state, the determination unit 404 determines that the data processing unit 103 receives data.

At that time, the determination unit 404 informs the buffer 302 of the reception of data via the signal line 360 and clears the valid flag of a packet to be stored in the buffer 302 and invalidates the packet. The determination unit 404 validates a count validation signal and outputs the count validation signal to the counter 402. In order to acquire the next data, the counter 402 increments the counter value by 1 (or add 1 to the count value thereof) in the next clock cycle. Simultaneously, the determination unit 404 validates a valid signal on the signal line 357 and controls the selector 406 to output data contained in the packet received from the signal line 357 to the output terminal 352. As a result of this processing, the buffer 405 becomes empty and is put into a state in which the buffer 405 can receive data. Thus, the determination unit 404 validates an enable signal on the signal line 364.

On the other hand, in a case where the buffer 405 is empty, where an input packet determination signal and a count value signal are valid, and where a stall signal output via the signal line 353 from the data processing unit 103 connected to the receiving unit 301 is valid, the determination unit 404 determines that the data processing unit 103 cannot receive data. When the determination unit 404 determines that the data processing unit 103 cannot receive data, the determination unit 404 controls the buffer 405 to receive a data part of the packet. Simultaneously, the determination unit 404 informs the buffer 302 of the reception of data via the signal line 360 and clears the valid flag of the packet to be stored in the buffer 302, so that the packet is invalidated.

At that time, the determination unit 404 invalidates a count validation signal to be supplied to the counter 302, so that the count value of the counter 302 is not incremented. The determination unit 404 validates a valid signal on the signal 351 and controls the selector 406 to output to the output terminal 352 a data part of the packet stored in the buffer 405. In addition, because data is stored in the buffer 405, the determination unit 404 invalidates an enable signal on the signal line 364.

When an enable signal on the signal line 364 is invalid, if the data processing unit 103 can receive data and a stall signal on the signal line 353 is invalid, the data processing unit 103 receives data stored in the buffer 405 via the output terminal 352 in the next clock cycle. At that time, the counter 302 increments the count value by 1 (i.e., adds 1 to the count value) in the next clock cycle. The buffer 405 is empty and can receive data. Thus, the determination unit 404 validates an enable signal on the signal line 364.

When the input packet determination signal is invalid, the data is not processed by the data processing unit 103. Thus, the determination unit 404 informs the buffer 302 via the signal line 360 that the data processing unit 103 does not receive the data. The determination unit 404 does not change the packet stored in the buffer 302. At that time, the determination unit 404 does not change information represented by the count validation signal to be supplied to the counter 402, the valid signal on the signal 351, the enable signal on the signal line 364, and information stored in the buffer 405.

Next, an operation to be performed when the value of the register 407 is valid is described. In this case, the determination unit 404 causes the selector 406 to always select a path passing through the buffer 405, so that an enable signal on the signal line 364 is always validated.

An operation of the comparison unit 403 is the same as that in a case where the mask register 407 is invalid. Thus, description of an operation of the comparison unit 403 is omitted.

In a case where the input packet determination signal and the count value match signal are valid and where a stall signal output via the signal 353 from the data processing unit 103 connected to the receiving unit 301 is invalid, the determination unit 404 determines that the data processing unit 103 receives data. In this case, the determination unit 404 informs the buffer 302 via the signal line 360 of the reception of the data and clears the valid flag of the packet stored in the buffer 302 to invalidate the packet. The determination unit 404 validates the count validation signal and outputs the validated count validation signal to the counter 402. In order to acquire the next data, the determination unit 404 causes the counter 402 to increment the count value by 1 (i.e., add 1 to the count value). Simultaneously, the determination unit 404 validates the valid signal on the signal line 351 and outputs a data part of the packet to the output terminal 352 via the selector 406.

On the other hand, in a case where the input packet determination signal and the count value match signal are valid and where the stall signal transmitted via the signal line 353 from the data processing unit 103 connected to the receiving unit 301 is valid, the determination unit 404 determines that the data processing unit 103 cannot receive data to be received. Then, the determination unit 404 informs the buffer 302 via the signal line 360 that the data cannot be received by the data processing unit. The determination unit 404 sets a stall flag of the packet stored in the buffer 302, so that this packet becomes a stall packet. At that time, the determination unit 404 invalidates a count validation signal to be input to the counter 402 to prevent the counter 402 from incrementing the count value thereof by 1. The determination unit 404 invalidates the valid signal on the signal line 351.

Similarly, in a case where the input packet determination signal is valid and where the count value match signal is invalid, the determination unit 404 determines that an input packet is a receiving target packet and that a data receiving sequence is wrong. Then, the determination unit 404 informs the buffer 302 via the signal line 360 of a pending state of the data and sets a stall flag of the packet to be stored in the buffer 302.

When the input packet determination signal is invalid, the data is not processed by the data processing unit 103. Thus, the determination unit 404 informs the buffer 302 via the signal line 360 that the data is not received by the data processing unit. The determination unit 404 does not change the packet stored in the buffer 302.

Figure 5:
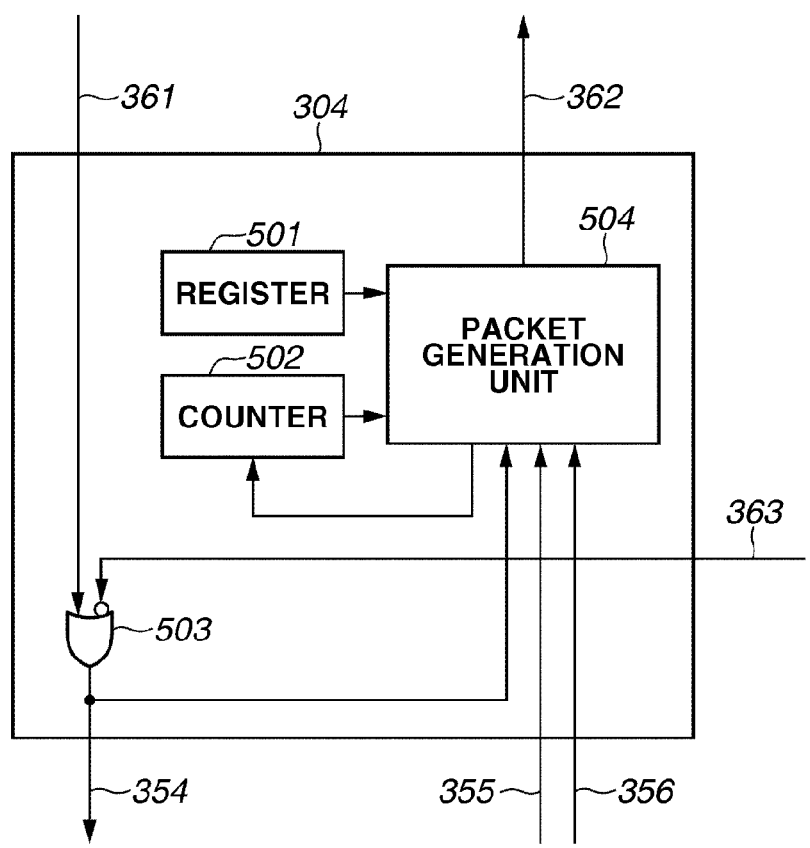
FIG. 5 schematically illustrates a data transmitting unit of the communication unit illustrated in FIG. 3.

FIG. 5 is a block diagram schematically illustrating a configuration of the data transmitting unit 403. As illustrated in FIG. 5, the data transmitting unit 304 includes a register (storage unit) 501, a counter 502, an OR-gate 503, and a packet generation unit 504.

The valid flag of an output packet of the buffer 302 is input to the OR-gate 503 via the input terminal 361. An inversion signal of an enable signal input via the input terminal 363 from the receiving unit 301 provided at a downstream side in the data transfer direction is input to the OR-gate 503. Then, the OR-gate 503 outputs a stall signal to the signal line 354 as an output signal. More specifically, when an output packet of the ring bus 106 (particularly, the buffer 302) is valid, or when an enable signal output from the receiving unit 302 provided at the downstream side in the data transfer direction is invalid, the data transmitting unit 304 cannot receive data from the data processing unit 103. Thus, the stall signal on the signal line 354 is validated. Then, the stall signal on the signal line 354 is also input to the packet generation unit 504.

The packet generation unit 504 refers to a valid signal transmitted from the data processing unit 103 connected thereto via the signal line 356. When the valid signal represents valid, the packet generation unit 504 determines that the data processing unit 103 can output data. In a case where the packet generation unit 504 determines that the data processing unit 103 can output data, and where the stall signal on the signal line 354 is invalid, the packet generation unit 504 generates a packet which stores the count value of the counter 502 and the connection ID set in the register 501. The packet generation unit 504 sets as valid the valid flag of a packet to be generated, which indicates that the packet is valid, and the stall flag thereof as invalid. In addition, the data processing unit 103 outputs processed data to the communication unit 102 via the signal line 355.

The packet generation unit 504 receives the data and stores the received data in the data part of the packet. Then, the packet generation unit 504 controls the selector 303 to flow the generated packet via the output terminal 359 towards a downstream side in the data transfer direction of the ring bus 106. In the next clock cycle, the counter 502 increments the count value by 1 (i.e., adds 1 to the count value). In order to synchronize the counter 502 of the transmitting unit 304 and the counter 402 of the receiving unit 301 which receives a packet from the transmitting unit 304, the count values of the counters 502 and 402 are initialized to the same value before start of data transfer.

Next, a practical operation of the data processing unit according to the present embodiment is described with reference to a signal flow graph illustrated in FIGS. 7A through 7D and to FIG. 6, which illustrate a configuration of a plurality of processing modules of the data processing apparatus according to the present embodiment. In the signal flow graph, circles represent nodes, respectively. Arcs (arrows) represent processing-operations, respectively. In each of the data processing units 103-2 through 103-6, one of processing-operations A through E is performed on input data.

Figure 7A:
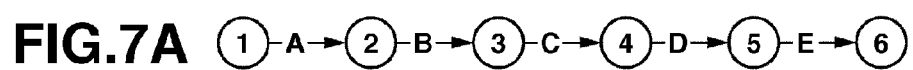
FIGS. 7A, 7B, 7C, and 7D illustrate flows of processing-operations to be performed by the data processing apparatus according to the exemplary embodiment of the present invention.

FIG. 7A illustrates a flow of performing processing-operations A, B, C, D, and E in an alphabetical order. At that time, the register 401 of the receiving unit of the communication unit 102-2 corresponding to the processing unit A (i.e., the data processing unit 103-2) preliminarily stores "1". The register 501 of the receiving unit of the communication unit 102-2 preliminarily stores "2". Similarly, a register of the receiving unit of the communication unit 102-3 preliminarily stores "2". A register of the transmitting unit of the communication unit 102-3 preliminarily stores "3". A register of the receiving unit of the communication unit 102-4 preliminarily stores "3". A register of the transmitting unit of the communication unit 102-4 preliminarily stores "4". A register of the receiving unit of the communication unit 102-5 preliminarily stores "4". A register of the transmitting unit of the communication unit 102-5 preliminarily stores "5". A register of the receiving unit of the communication unit 102-6 preliminarily stores "5". A register of the transmitting unit of the communication unit 102-5 preliminarily stores "6". The input terminal 151 corresponds to node "1". The output terminal 152 corresponds to node "6". Thus, a register of the receiving unit of the communication unit 102-1 preliminarily stores "6". A register of the transmitting unit of the communication unit 102-1 preliminarily stores "1".

Processing-operations are performed in a connection sequence illustrated in FIG. 6. Thus, the control unit 1000 sets all of the mask registers 407 of the communication units 102-1 through 102-6 at values representing "invalid". Accordingly, the communication units do not output stall packets. Thus, the counter values 203 are unnecessary.

The connection sequence is reverse to a sequence in which the above enable signal 601 can be propagated. The communication units 102 illustrated in FIG. 6 are connected in the following order of the connection IDs: 1→2→3→4→5→6→1. However, in some configuration of the data processing apparatus, the enable signal 601 does not always have to be propagated to all of the communication units 12. Thus, the connection sequence can be interrupted in midstream. When the communication unit 102-1 outputs a stall signal from the signal line 354 indicating an invalid state, data to be processed is input from the input terminal 151 of the input/output unit 101 connected to the communication unit 102-1. Then, the communication unit 102-1 packetizes the data to be processed, and outputs to the communication unit 102-2 a resultant packet to which the connection ID "1" is added. Because "1" is stored in the register 401 of the receiving unit thereof, the communication unit 102-2 receives the packet having a connection ID of "1" and inputs a data part of the received packet to the data processing unit 103-2.

At that time, when the stall signal transmitted from the data processing unit 103-2 via the signal line 353 represents an invalid state, the data processing unit 103-2 instantly performs the processing-operation A on the data to be processed. On the other hand, when the stall signal on the signal line 353 represents a valid state, the data to be processed is temporarily stored in the buffer 405. After the stall signal on the signal line 353 comes to represent an invalid state, the data processing unit 103-2 performs the processing-operation A on the data to be processed. Subsequently, when the stall signal on the signal line 354 comes to represent an invalid state, a packet having a connection ID of "2" is generated and output to the communication unit 102-3.

Since then, similarly, the communication unit 102-3 receives the packet having a connection ID of "2". The data processing unit 103-2 performs the processing-operation B on the received packet, generates a packet having a connection ID of "3", in which the processed data is stored, and outputs the generated packet to the communication unit 102-3. Then, the communication unit 102-4 receives the packet having a connection ID of "3". The data processing unit 103-4 performs the processing-operation C on the received packet having a connection ID of "3", generates a packet having a connection ID of "4", in which the processed data is stored, and outputs to the communication unit 102-5 the generated packet having a connection ID of "4". The communication unit 102-5 receives the packet having a connection ID of "4". The data processing unit 103-5 performs the processing-operation D on the received packet having a connection ID of "4", generates a packet having a connection ID of "5", in which the processed data is stored, and outputs to the communication unit 102-6 the generated packet having a connection ID of "5". The communication unit 102-6 receives the packet having a connection ID of "5". The data processing unit 103-6 performs the processing-operation E on the received packet having a connection ID of "5", generates a packet having a connection ID of "6", in which the processed data is stored, and outputs to the communication unit 102-1 the generated packet having a connection ID of "6". Finally, the communication unit 102-1 receives the packet having a connection ID of "6" because a register of the receiving unit 301 of the communication unit 102-1 stores "6". Then, the communication unit 102-1 outputs a data part of the received packet having a connection ID of "6" from the output terminal 152.

As described above, the data input to the input/output unit 101 undergoes the processing-operation A, the processing-operation B, the processing-operation C, the processing-operation D, and the processing-operation E in this order. Finally processed data is output from the input/output unit 101.

Thus, when two communication units (which are assumed to be a first communication unit and a second communication unit which is connected upstream from the first communication unit in the data transfer direction as an adjacent communication unit) consecutively perform processing on data in sequence along the data transfer direction, the two communication units communicate with each other according to a method (first mode) using a transfer enable signal, of which the communication unit is informed, via a signal line directly connected between the two communication units.

When a transfer enable signal for enabling data transfer from the first communication unit to the second communication unit is invalid, data transfer from the processing unit corresponding to the second communication unit to the second communication unit is stopped.

Figure 7B:
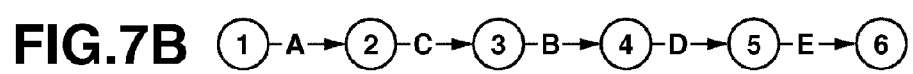

FIG. 7B is a signal flow graph illustrating a flow of processing, in which the order of performing the processing-operations B and C is reversed. In this case, a register of the receiving unit of the communication unit 102-3 preliminarily stores "3". A register of the transmitting unit of the communication unit 102-3 preliminarily stores "4". A register of the receiving unit of the communication unit 102-4 preliminarily stores "2". A register of the transmitting unit of the communication unit 102-4 preliminarily stores "3". Then, the other communication units 102 are set similar to those illustrated in FIG. 7A. Consequently, a flow of the processing-operations illustrated in FIG. 7B can be implemented.

When the processing-operations A, C, B, and D are controlled to be performed in this order, the data processing apparatus of the configuration illustrated in FIG. 6 cannot implement (data-transfer) enable control using the signal line 364. Thus, the control unit 1000 sets the mask registers of the communication units 102-3 through 102-5 to be valid. On the other hand, the enable control can be performed by processing from the input terminal (node 1) to the processing unit A and processing from the processing unit D through the processing unit E to the output terminal (node 6) using the signal line 364. Thus, the control unit sets the mask registers of the communication units 102-1 through 102-2 and 102-6 to be invalid.

A packet is sent to the communication unit, whose mask register 407 is set to be invalid, from an adjacent communication unit provided in a data transfer direction side by the enable control. Accordingly, it is unnecessary that the determination unit 404 determines whether the count value 203 of a packet and the value of the counter 402 are matched with each other. Thus, description of determination of whether the count value is matched with the value stored in each of the communication units 102-1 through 102-2 and 102-6 is omitted.

When the stall signal on the signal line 354 of the communication unit 102-1 is invalid, the connection ID of "1" and the count value of the counter 502 are added at the communication unit 102-1 to the data input from the input terminal 151. Then, resultant data is output to the communication unit 102-2.

Because "1" is stored in the register 401 of the receiving unit, the communication unit 102-2 receives a packet whose count value is matched with the connection ID of "1". Then, the communication unit 102-2 inputs the data part of the received packet to the data processing unit 103-2. At that time, the mask register 407 is set to be invalid. Thus, when the stall signal on the signal line 353 is invalid, the processing-operation A is immediately started at the data processing unit 103-2. When the stall signal on the signal line 353 is valid, the packet is temporarily stored in the buffer 405. The processing-operation A is not started until the stall signal 353 becomes invalid. After that, when the stall signal on the signal line 354 becomes invalid, a packet having a connection ID of "2" is generated and output to the communication unit 102-3, because "2" is stored in the register 501 of the transmitting unit of the communication unit 102-2.

Because "3" is registered in the register 401 of the receiving unit of the communication unit 102-3, the processing unit does not receive information other than a packet having a connection ID of "3" and outputs to the communication unit 102-4 the packet having a connection ID of 32 without being changed. Accordingly, the packet having a connection ID of "2" is subjected to no processing and output to the communication unit 102-4.

The communication unit 102-4 receives the packet having a connection ID of "2". The data processing unit 103-4 performs the processing-operation C on the received packet. At that time, the mask register 407 of the communication unit 102-4 is set to be valid. Thus, the processing-operation C is performed only in a case where the stall signal on the signal line 353 represents an invalid state, and where the count value 203 is equal to the value of the counter 402. Otherwise, as illustrated in FIG. 4, the determination unit 404 informs the buffer 302 via the signal line 360 of a pending state of the data and sets a stall flag of the packet to be stored in the buffer 302. Then, the stall packet is output therefrom to the communication unit 102-5.

When the stall packet circulates through the ring bus and returns to the communication unit 102-4, it is determined again whether the stall signal on the signal line 353 represents an invalid state, and whether the count value 203 is equal to the value of the counter 402. The processing-operation C is performed only when the above conditions are satisfied. The data subjected to the processing-operation C is stored in a packet having a connection ID of "3" and output to the communication unit 102-5.

Because "4" is stored in the register of the receiving unit 301, the communication unit 102-5 does not receive the packet having a connection ID of "3" and outputs this packet to the communication unit 102-6 without change. Similarly, no processing-operations are performed in the communication units 102-6, 102-1 and 102-2. Then, after four clock cycles have elapsed since the communication unit 102-4 has output the packet, the packet having a connection ID of "3" reaches the communication unit 102-3. The data processing unit 103-3 receives and performs the processing-operation B on this packet. The processed data part is stored in a packet having a connection ID of "4" and this packet is output to the communication unit 102-4. Because the mask register 407 of the communication unit 102-3 is set to be valid, the communication unit 102-3 operates by performing a procedure similar to that corresponding to the communication unit 102-4.

Because "2" is stored in the register of the receiving unit 301 of the communication unit 102-4, the packet having a connection ID of "4" is not received by processing units and is output to the communication unit 102-5 without change.

The communication unit 102-5 receives the packet having a connection ID of "4". Then, the data processing unit 103-5 performs the processing-operation D on the received packet having a connection ID of "4". Next, the data processing unit 103-5 generates a packet having a connection ID of "5" and outputs this packet to the communication unit 102-6. Because the mask register 407 of the communication unit 102-5 is set to be valid, the communication unit 102-5 operates by performing a procedure similar to that corresponding to the communication unit 102-4.

The communication unit 102-6 receives the packet having a connection ID of "5". Then, the data processing unit 103-6 performs the processing-operation E on the received packet having a connection ID of "5". Next, the data processing unit 103-6 generates a packet having a connection ID of "6" and outputs this packet to the communication unit 102-1. Because the mask register 407 of the communication unit 102-6 is set to be valid, the communication unit 102-6 operates by performing a procedure similar to that corresponding to the communication unit 102-2.

Because "6" is stored in the register of the receiving unit 301 of the communication unit 102-1, the communication unit 102-1 receives the packet having a connection ID of "6", and outputs a data part of this packet from the output terminal 152. Thus, the input data is subjected to the processing-operation A, the processing-operation C, the processing-operation B, the processing-operation D, and the processing-operation E in this order. Finally resultant data is output from this output terminal.

When two communication units do not satisfy the conditions for the transfer method (first mode) using a transfer enable signal, communications between such two communication units are performed according to a method (second mode) using no transfer enable signal.

Figure 7C:
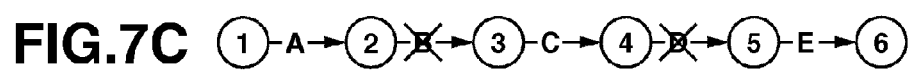

FIG. 7C is a signal flow graph illustrating a flow of processing performed by skipping the processing-operations B and D. In this case, the control unit 1000 sets a register (register 401) of the receiving unit and that (register 501) of the transmitting unit in a manner similar to that illustrated in FIG. 7A. The mask registers 40 of all of the communication units are set to be invalid. In addition, it is sufficient to set a parameter such that the processing units 103-3 and 103-5 skip the pipeline processing (e.g., if the processing units are variable power modules, a variable power rate is set at '1'). In order to cause a processing unit to skip the pipeline processing, it is necessary to set information in a register of the processing unit. However, the processing unit does not process data. Consequently, a load to the processing unit is small.

Figure 7D:
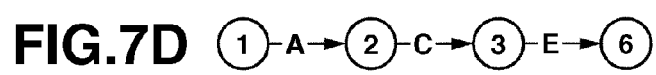

In order to implement a flow illustrated in FIG. 7D, "1" is preliminarily stored in a register (register 401) of the receiving unit of the communication unit 102-2 corresponding to the processing-operation A (performed in the data processing unit 103-2). In addition, "2" is preliminarily stored in a register (register 501) of the transmitting unit of the communication unit 102-2. Similarly, "2" is preliminarily stored in a register of the receiving unit of the communication unit 102-4, and "3" is preliminarily stored in a register of the transmitting unit of the communication unit 102-4. Further, "3" is preliminarily stored in a register of the receiving unit of the communication unit 102-6, and "6" is preliminarily stored in a register of the transmitting unit of the communication unit 102-6. Similarly, "6" is preliminarily stored in a register of the receiving unit of the communication unit 102-1, and "1" is preliminarily stored in a register of the transmitting unit of the communication unit 102-1.

In addition, the control unit 1000 sets the mask registers 407 of the communication units 102-1 and 102-6 to be invalid. The control unit 1000 sets the mask registers 407 of the communication units 102-3 through 102-5 to be valid. Consequently, a flow illustrated in FIG. 7D can be implemented. In order to prevent the reception of a packet, values (i.e., 4 and 5), which are not used in the signal flow graph, are preliminarily set in the registers of the receiving units of the communication units 102-3 and 102-5.

Thus, according to the data processing apparatus of the present embodiment, transfer of data from the communication unit to the processing unit is controlled by the data transfer enable signal. Data processed by the data processing unit is prevented from being output to the ring bus. Consequently, an amount of traffic on the ring bus can be reduced while occurrence of a stall packet is prevented. Accordingly, frequency of occurrence of a deadlock state can be reduced by decreasing the occupancy rate of the ring bus.

Because data transfer can be enabled/disabled at each communication unit by the data transfer enable signal, the processing sequence can be changed. Accordingly, a flexible data processing apparatus can be implemented.

When occurrence of a stall packet at a specific processing unit is to be prevented, it is not indispensable to connect all of the processing units with the enable signal line 601 (364) as illustrated in FIG. 6. The number of stall packets caused at a specific communication unit can be reduced by connecting the specific communication unit to another communication unit with the enable signal line and controlling the communication units according to the enable signal. Accordingly, the two communication units to be connected with the enable signal line do not always adjoin each other.

Next, an operation of implementing the above setting of each module by the control unit 1000 is described.

Figure 11:
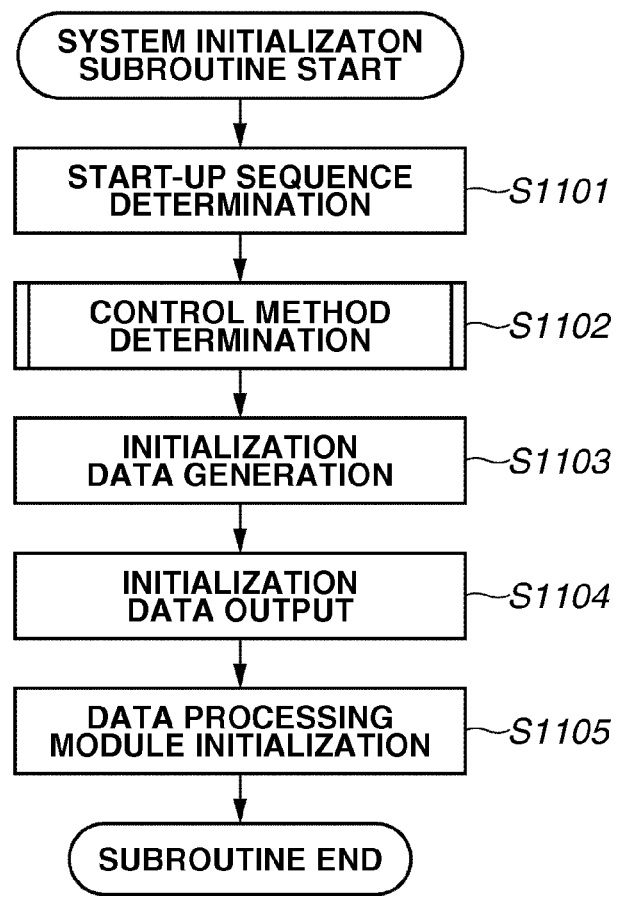
FIG. 11 illustrates processing to be performed in an initialization phase by a control unit of the data processing apparatus according to the exemplary embodiment of the present invention.

A process performed by the data processing apparatus according to the present embodiment includes an initialization phase and a data processing phase. FIG. 11 is a flowchart illustrating processing to be performed by the control unit 1000 in the initialization phase. In step S1101, the control unit 1000 determines a processing sequence of processing performed by the processing module. To determine the processing sequence, in, e.g., the ROM 1003 and the external storage apparatus 1004, information (e.g., a table and a list) may be stored according to which the corresponding relationship between the type of the pipeline processing performed by the data processing unit 1020 and the processing sequence can be determined.

Alternatively, to determine the processing sequence, e.g., information representing the corresponding relationship between each representative function and the processing module may be stored in the ROM 1003 and the external storage apparatus 1004 so that the control unit 1000 may functionally divide processing directed by a user (or application-program) and adaptively determine the processing sequence of the processing modules.

In step S1102, the control unit 1000 compares the processing sequence determined in step S1101 with the connection sequence. The connection sequence is not changed as long as physical connection relationship among the processing modules is not changed by a switch (e.g., a crossbar switch). Accordingly, it is desirable to preliminarily store information representing the connection sequence in the control unit 1000.

The control unit 1000 compares the processing sequence with the connection sequence to detect a sequence in which the processing sequence is matched with the connection sequence. For example, in a case where the connection sequence is expressed by node numbers as 2→3→4→5, and where the processing sequence is expressed by node numbers as 4→5→2→3, sequences "2→3" and "4→5" are detected as matched sequences. The control unit 1000 determines a control method for each module based on this result of the detection (i.e., whether the mask register 407 of each module is validated).

In step S1103, the control unit 1000 generates initialization data for initializing the processing modules. The initialization data includes information representing the processing sequence of the data processing modules (the IDs of queued packets and those of packets to be transmitted) and information representing processing modules which perform direct control and are determined in the step S1102.

In step S1104, the control unit 1000 causes the initialization data generated in step S1103 to flow into the ring-shaped bus 106 through the input/output unit 101.

In step S1105, each processing module receives the initialization data according to the connection sequence and sets, in itself, information representing ID of the data processing module to which processing termination data is sent, and information representing how the module is informed of an enable signal and controls an operation.

In step S1102, the control unit 1000 determines the data processing modules which perform direct control (i.e., the modules are informed of an enable signal and perform a control operation in the first mode) based on the procedure illustrated in FIG. 12. Hereinafter, the direct control is described in detail with reference to FIG. 12.

In step S1201, the control unit 1000 scans the IDs of the processing modules according to the connection sequence. Processing in steps S1202 through S1205 is performed on each of the IDs of the processing modules. Thus, the control unit 1000 determines the processing modules perform the direct control. In step S1202, the control unit 1000 records a currently scanned data processing module ID in an ID variable "CURRENT". The control unit 1000 records an ID of a data processing module subsequent to the currently scanned data processing module in the bus connection sequence in another ID variable "NEXT".

In step S1203, the control unit 1000 determines whether a start-up sequence "CURRENT→NEXT" is present in the processing sequence of the processing modules, which is externally received. If the start-up sequence "CURRENT→NEXT" is present in the received processing sequence (YES in step S1203), the control unit 1000 performs processing in step S1204. Otherwise (NO in step S1203), the control unit 1000 performs processing in step S1205.

In step S1204, the control unit 1000 generates setting information indicating that the processing module corresponding to the ID stored in the ID variable "CURRENT" performs the direct control (i.e., the setting information indicating the ID of the processing module whose mask register is set to be invalid).

In step S1205, the control unit 1000 generates setting information indicating that the data processing module corresponding to the ID stored in the ID variable "CURRENT" performs ring control (i.e., the module is informed of an enable signal and performs a control operation in the second mode).

The setting information, which represents the control method performed by the processing module and is generated by the control unit 1000 in steps S1204 and S1205, is used in the initialization of all of the processing modules in steps S1103, S1104, and S1105.

The processing modules are initialized, as described above. Thus, the initialization of the processing modules can be performed so that the processing module which performs the direct control is detected so as to be able to control an output of the precedent processing module based on the direct control. Consequently, data transmission among the processing modules can be controlled by combining the ring bus control method and the direct control method using the control signal line. As described above, according to the present embodiment, the data processing apparatus having a plurality of modules, the processing sequence of which is variable, can efficiently suppress an increase of the number of stall packets and an amount of traffic while the circuit size of the apparatus is suppressed using a small number of signal lines.

Figure 8:
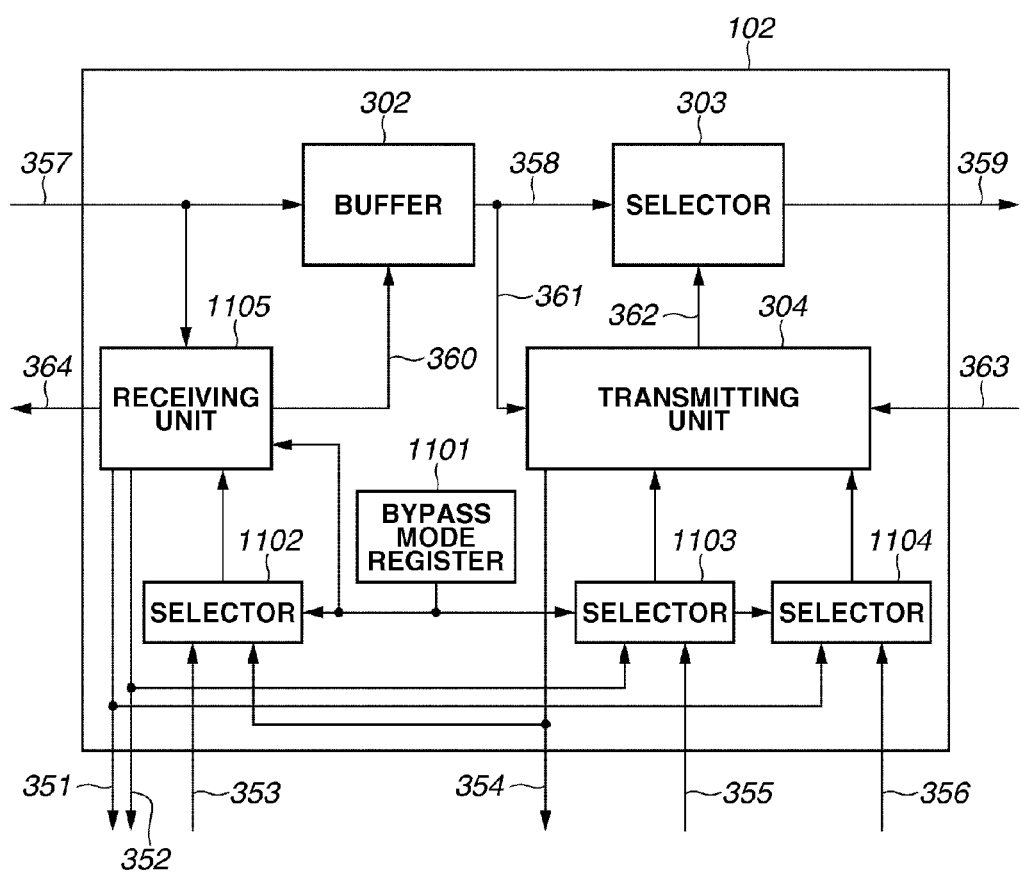
FIG. 8 schematically illustrates a configuration of the communication unit according to an exemplary embodiment of the present invention.

Next, a second exemplary embodiment obtained by changing the configuration of the communication unit 102 illustrated in FIG. 6 from that illustrated in FIG. 3 to that illustrated in FIG. 8 is described. Accordingly, redundant description overlapping with the foregoing description of the first exemplary embodiment is omitted.

FIG. 8 is a block diagram schematically illustrating a configuration of the communication unit 102. In FIG. 8, components which are the same as those illustrated in FIG. 3 are designated with the same reference numeral used in FIG. 3. Description of each component having substantially the same function as that of the component illustrated in FIG. 3 is omitted. Among the components illustrated in FIG. 8, a bypass mode register 1101 and selectors 1102 through 1104 are added to the configuration illustrated in FIG. 3. A receiving unit 1105 changes its functions from those illustrated in FIG. 3.

The first exemplary embodiment using the communication unit 12 illustrated in FIG. 3 implements the processing sequence illustrated in the signal flow graph shown in FIG. 7C by invalidating the function of the processing unit 103, when only specific processing-operations are skipped (or bypassed). Thus, the first exemplary embodiment requires clock cycles for latency of the data processing unit 103 so as to skip the specific processing-operations. However, the second exemplary embodiment using the communication unit 102 illustrated in FIG. 8 is configured such that in a bypass mode (third mode), the communication unit 102 bypasses a specific processing-operation therein without using the data processing unit 103 and causes data to flow into the subsequent stage. Thus, the present embodiment can skip a specific processing-operation only by a delay of one clock cycle. Consequently, throughput can be enhanced when a specific processing-operation is skipped, as illustrated in FIG. 7C.

The bypass mode register 1101 stores a set value indicating whether a processing-operation is bypassed.

When the bypass mode register 1101 stores a value indicating an invalid state, a function of the data receiving unit 1105 is the same as that of the data receiving unit 301. The other connection operations are the same as those illustrated in FIG. 3. More specifically, the selector 1102 selects a stall signal on the signal line 353 and inputs the selected stall signal to the data receiving unit 1105. The selector 1103 selects data input via the signal line 355 from the data processing unit 103 and inputs the selected data to a data transmitting unit 304. The selector 1104 selects a valid signal input via the signal line 356 from the data processing unit 103 and inputs the selected valid signal to the data transmitting unit 304.

When the bypass mode register 1101 is valid, the selector 1102 selects an enable signal on the signal line 354 and inputs the selected enable signal to the data receiving unit 1105. The selector 1103 selects a data output signal on the signal line 352, which is output from the data receiving unit 1105, and inputs the selected data output signal to the data transmitting unit 304. In addition, the selector 1104 selects a valid signal input from the data receiving unit 1105 via the signal line 351 and inputs the selected valid signal to the data transmitting unit 304.

Hereinafter, an operation of the communication unit 102 according to the present embodiment is described. However, an operation thereof when the bypass mode register 1101 is invalid is similar to that of the communication unit of the first exemplary embodiment illustrated in FIG. 3. Thus, description of an operation thereof in a case where the bypass mode register 1101 is invalid is omitted.

Next, an operation of the communication unit 102 in a case where the bypass mode register 1101 is valid is described. In the bypass mode, the mask register 407 always stores a value indicating an invalid state.

A packet input to the communication unit 102 from the adjacent communication unit 102 provided at the upstream side in the data transfer direction is temporarily stored in the buffer 302. In the next clock cycle, the packet is output to the selector 303. The data receiving unit 1105 monitors a packet at the input terminal 357 and receives, in a case where the valid flag of the packet is valid, where the connection ID and the count value stored in the packet are matched with values stored in the receiving unit 1105, and where a stall signal input thereto from the signal line 354 via the selector 1102 is invalid, the inner buffer (buffer 405) of the data receiving unit 1105 receives the packet and outputs the packet from the output terminal 352 (by validating the valid signal 351). At that time, the data receiving unit 1105 informs the buffer 302 of the reception of data via the signal line 360, clears the valid flag of the packet stored in the buffer 302, and invalidates the packet. After the reception of the packet, the count value is incremented.

In a case where the valid flag of the input packet is valid, where the connection ID and the count value stored in the packet are matched with the values of the data receiving unit 1105, and where a stall signal on the signal line 354 is valid, the data stored in the buffer 405 is maintained. The receiving unit 1105 inverts a value represented by the stall signal on the signal line 354 and outputs a signal representing the inverted value as an enable signal on the signal line 364.

The data transmitting unit 304 monitors the valid flag (on the signal line 361) of an output packet (on the signal line 358) of the buffer 302. When the valid flag represents valid, data cannot be output to the ring bus. In order to suspend data output from the receiving unit 1105 connected to the transmitting unit 304 via the selector 1103, the stall signal on the signal line 354 is set. Even when an enable signal input from the input terminal 363 is invalid, the stall signal is set on the signal line 354. When the enable signal is valid, and the valid flag represents invalid, the stall signal on the signal line 354 is reset.

When data can be output from the receiving unit 1105 (the valid signal on the signal line 351 is valid), the transmitting unit 304 checks whether the valid flag of the output packet of the buffer 302 is invalid, and whether the enable signal input from the input terminal 363 is valid. If these conditions are satisfied, the data transmitting unit 304 generates a packet having the count value and the connection ID set in the register, validates the valid flag and invalidates the stall flag. In addition, the data transmitting unit 304 receives data processed by the data processing unit 103 via the signal line 355 and stores the received data in the data part of the generated packet. Then, the selector 303 is controlled to cause the generated packet to flow onto the ring bus from the output terminal 359. After the output of the packet, the count value is incremented.

Figure 9:
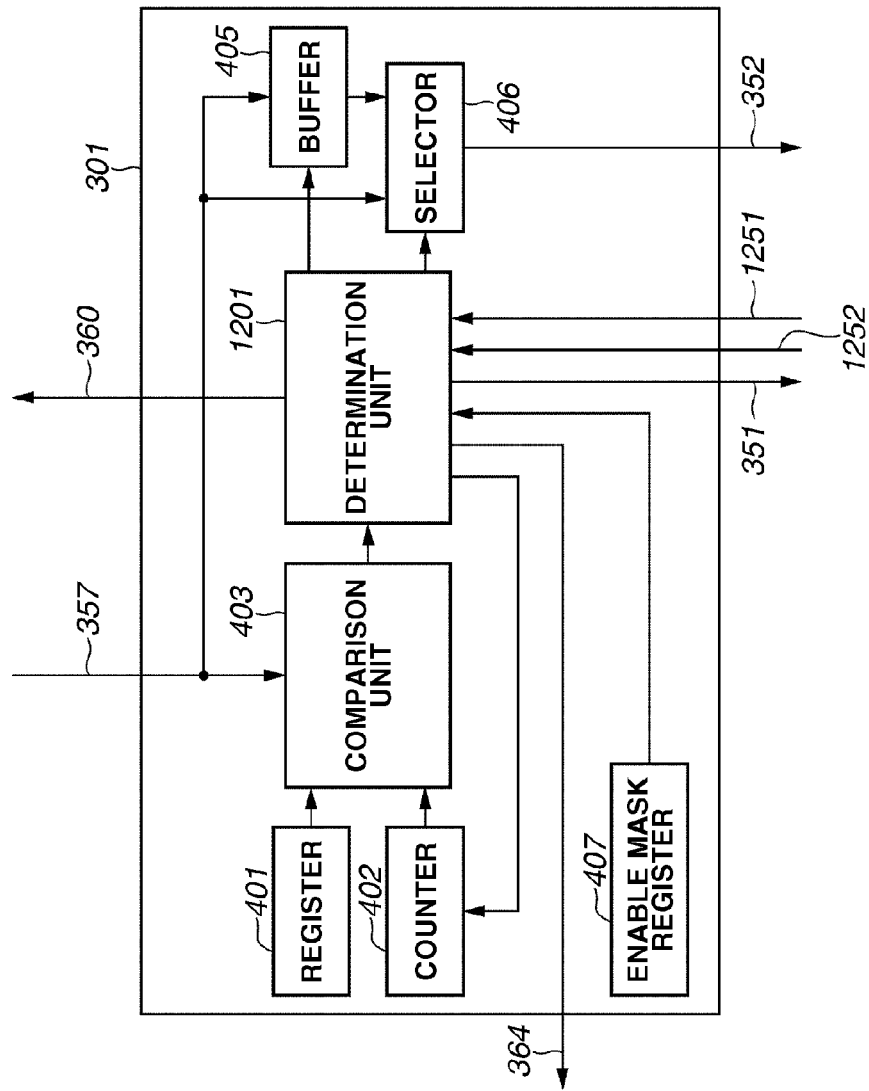
FIG. 9 schematically illustrates a configuration of a data receiving unit according to the exemplary embodiment of the present invention.

FIG. 9 is a block diagram schematically illustrating a configuration of the data receiving unit 1105 according to the second exemplary embodiment. In FIG. 9, components which are the same as those illustrated in FIG. 4 are designated with the same reference numeral used in FIG. 4. Description of such components is omitted. A determination unit 1201 changes a function from that of a component illustrated in FIG. 4. Components added to the components illustrated in FIG. 4 are a signal line 1251 for transmitting a bypass mode signal which indicates a value of the bypass register mode register 1101, and a signal line 1252, connected to an output of the selector 1102, for transmitting a stall signal having a function equivalent to that of the stall signal on the signal line 353.

First, an operation of the data receiving unit 1105 when the bypass mode signal on the signal line 1251 is invalid is the same as that of the data receiving unit according to the first exemplary embodiment. Thus, description of such an operation is omitted.

Next, an operation of the data receiving unit in a case where the bypass mode signal on the signal line 1251 is valid is described. As described in the description of the communication unit illustrated in FIG. 8, in the bypass mode, the mask register 407 is always set to be invalid. When the bypass mode signal on the signal line 1251 is valid, the determination unit 1201 controls the selector 406 and always selects an output of the buffer 405.

The comparison unit 403 monitors the valid flag, the connection ID, and the count value of a packet on the ring bus, which is input from the input terminal 357. The comparison unit 403 outputs to the determination unit 1201 an input packet determination signal indicating that the valid flag of the input packet represents valid, and that the connection ID of the packet is matched with the connection ID stored in the register 401, and a count value match signal indicating that the count value stored in the packet is matched with the value of the counter 402.

The determination unit 1201 causes the buffer 405 to receive a data part of an input packet when the input packet determination signal and the count value match signal are valid, and the stall signal on the signal line 1252 is invalid. In this case, the determination unit 1201 informs the buffer 302 via the signal line 360 of the reception of the data, clears the valid flag of the packet stored in the buffer 302, and invalidates the packet. The determination unit 1201 validates a count validation signal and outputs the count validation signal. In order to acquire the next data, in the next clock cycle, the determination unit 1201 increments the count value of the counter 302 by 1. Simultaneously, the determination unit 1201 validates a valid signal 351 and outputs the data part of the packet to the output terminal 352 through the selector 406.

On the other hand, the determination unit 1201 holds data stored in the buffer 405 when the input packet determination signal and the count value match signal are valid, and the stall signal 1252 is valid. At that time, the determination unit 1201 invalidates a count validation signal to be sent to the counter 402, so that the count value of the counter 402 is not incremented. In addition, the determination unit 1201 stores the value represented by the valid signal 351. At that time, the determination unit 1201 outputs, to the output terminal 352 via the selector 406, a data part of the packet stored in the buffer 405

In addition, the determination unit 1201 informs, when an input packet determination signal is invalid, the buffer 302 via the signal line 360 that the receiving unit 301 receives no data. The determination unit 1201 does not change the packet stored in the buffer 302. At that time, the determination unit 1201 does not change the values represented by the count validation signal to be sent to the counter 402, the valid signal on the signal line 351, and the enable signal on the signal line 364, and the data stored in the buffer 405. As described in the description of the communication unit illustrated in FIG. 8, a signal inverting a value represented by the stall signal on the signal line 1252 is output as an enable signal on the signal line 364. The configuration of each transmitting unit according to the second embodiment is the same as that of each transmitting unit according to the first exemplary embodiment. Therefore, description of the configuration of each transmitting unit according to the second embodiment is omitted.

Next, an operation of the data processing apparatus according to the present embodiment is described with reference to signal flow graphs illustrated in FIGS. 7A through 7D. Processing illustrated in FIGS. 7A, 7B, and 7D is performed by setting the bypass mode registers 1101 of all of the communication units to be invalid. Therefore, the processing illustrated in FIGS. 7A, 7B, and 7D is similar to that of the first exemplary embodiment, which has been described with reference to FIGS. 7A, 7B, and 7D. Accordingly, description of the processing illustrated in FIGS. 7A, 7B, and 7D according to the second exemplary embodiment is omitted.

Hereinafter, an operation of the data processing apparatus according to the second exemplary embodiment in a case where the bypass mode register 1101 of the communication unit connected to the processing unit for performing the processing-operation to be bypassed as illustrated in FIG. 7C is set valid, is described.

First, according to a flow similar to that illustrated in FIG. 7C, setting of the register (register 401) of the data receiving unit and the register (register 501) of the data transmitting unit is performed. The mask registers 407 of all of the communication units are set to be invalid. Then, the data processing units 103-3 and 103-5 set the bypass mode registers 1101 to be valid. Although the above first exemplary embodiment does not perform the processing-operations B and D, the first exemplary embodiment requires extra clock cycles of latencies of the data processing units 103-3 and 103-5. However, according to the second exemplary embodiment, the processing-operations B and D are respectively bypassed in the communication units 102-3 and 102-5 without using the data processing units 103-3 and 103-5. Thus, the second exemplary embodiment can implement the flow illustrated in FIG. 7C only by a delay of one clock cycle. Consequently, throughput can be enhanced.

Thus, according to the data processing apparatus of the present embodiment, a buffer is provided in each communication unit connecting the ring bus and the associated processing unit. Transfer of data from the communication unit to the processing unit is controlled by the data transfer enable signal. Consequently, occurrence of a stall packet is prevented. Accordingly, frequency of occurrence of a deadlock state can be reduced by decreasing the occupancy rate of the ring bus.

Because the mask register is provided in each communication unit, enabling/disabling of the transfer of data can be performed according to the enable signal. Consequently, the processing sequence can be changed. In addition, the bypass mode register is provided in each communication unit. Consequently, the unnecessary processing unit for performing a processing-operation to be skipped can be bypassed in a minimum number of clock cycles.

The diagrams schematically illustrating configurations of various portions of the data processing apparatuses according to the above exemplary embodiments are shown to describe the present invention and illustrate connection relationship among circuits and functional means of the data processing apparatus according to the present invention and are not intended to limit positional relationship among components of the data processing apparatuses. For convenience of description of the present invention, an example of the data processing apparatus having six communication units has been described. However, it is sufficient that the data processing apparatus according to the present invention has three or more communication units and two or more processing units.

Although not described in the foregoing description of the above exemplary embodiments, processing units according to the present invention perform parallel computing. The present invention is suitable for use with ultrafast speed parallel processors (multi-core processors). When parallel computing is performed, it is ideal that load is equally distributed among processing units. Therefore, it is preferable to perform parallel processing by dividing input data at a data acquisition unit or the like into packets each having a predetermined length (or data pieces each having a predetermined amount) and then distributing the packets (or the data pieces) among processing units respectively having equivalent processing functions.

The above exemplary embodiments use the valid flag indicating whether a packet having the valid flag is valid. However, the length of a packet format can be shortened by setting a specific connection ID (e.g., "0") as indicating an invalid flag (thus the specific connection ID is equivalent to the valid flag "0").

Data acquired externally can be input to the apparatus without change by preliminarily setting the data to have a packet format used in the ring bus. In addition, the processing units can be adapted to interpret packets and directly process the packets.

The diagrams schematically illustrating configurations of various portions of the data processing apparatuses according to the above exemplary embodiments are shown to describe the present invention and illustrate connection relationship among circuits and functional means of the data processing apparatus according to the present invention and are not intended to limit positional relationship among components and the number of components of the data processing apparatuses. For example, it is sufficient that the data processing apparatus according to the present invention has three or more communication units and two or more processing units.

The diagrams schematically illustrating configurations of various portions of the data processing apparatuses according to the above exemplary embodiments are shown to describe the present invention and illustrate connection relationship among circuits and functional means of the data processing apparatus according to the present invention and are not intended to limit positional relationship among components of the data processing apparatuses. For example, the processing modules can be formed as separate chips. Alternatively, the processing modules can be formed as a single chip. The same holds for the processing units and the communication units. The entire apparatus according to the present invention can be formed as a single chip.

In the foregoing description of the above exemplary embodiment, the apparatus having processing modules arranged in a ring-type topology has been described by way of example. However, the arrangement of the processing modules according to the present invention is not limited to the ring-type topology. For example, even in a case where the processing modules are arranged in a bus type topology, or where the processing modules are arranged like a mesh, efficiency of transfer of data can be enhanced by applying the present invention to all apparatuses and methods for dividing a sequence of data processing-operations (to be performed as pipeline processing) into groups and sequentially performing the parallel processing by a plurality of modules as pipeline processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

Aspects of the present invention can also be realized by a computer of a system or apparatus (or devices such as a CPU or micro processing unit (MPU)) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

This application claims priority from Japanese Patent Application No. 2009-064683, filed Mar. 17, 2009 and No. 2009-224834, filed Sep. 29, 2009, which are hereby incorporated by reference herein in their entirety.

What is claimed is:

1. A data processing apparatus in which a plurality of processing modules is connected in a ring via a bus and transfers data in a transfer direction along the ring to perform processing on the data, each of the processing modules comprising:

a communication unit configured to receive data via the bus from an upstream direction along the ring and to transmit the received data in a downstream direction along the ring;

a processing unit connected one-to-one to the communication unit and configured to perform processing on data received from the communication unit; and a signal line through which an enable signal is transmitted in an enable signal direction along the ring, wherein the communication unit controls transmission of data in the processing unit corresponding to a processing module in response to an enable signal sent from another communication unit in the enable signal direction different from the transfer direction, the other communication unit being located downstream from the communication unit in the downstream direction along the ring,
wherein when a first one of the communication units and a first one of the other communication units, which is connected to an upstream side in a data transfer direction and is adjacent to the first one of the communication units, process data sequentially along the transfer direction, the first one of the other communication units outputs data on the ring bus in a first mode, in which a transfer enable signal sent from the first one of the communication units is used, and
wherein when the first one of the communication units and the first one of the other communication units, which is connected to an upstream side in the transfer direction and is adjacent to the first one of the communication units, perform processing on data in a sequence not along the transfer direction or non-sequentially, the first one of the other communication units outputs data on the ring bus in a second mode in which a transfer enable signal sent from the first one of the communication units is not used.

2. The data processing apparatus according to claim 1, wherein when the enable signal sent from the other communication unit in the enable signal direction along the ring indicates an invalid state, the communication unit stops transfer of data from the processing unit to the communication unit.

3. The data processing apparatus according to claim 1, wherein when the communication unit receives data to be processed by the processing unit connected one-to-one thereto in a state in which the processing unit cannot process the data, the other communication unit outputs the data to the bus by adding to the data a flag indicating that the data is not processed.

4. The data processing apparatus according to claim 1, further comprising:
a memory unit configured to store an identifier (ID) for identifying data to be received, and an ID of the processing unit; and
a generation unit configured to generate a packet by adding the ID of the processing unit to data processed by the processing unit.

5. The data processing apparatus according to claim 1, wherein each of the communication units has a switching unit configured to switch between the first mode and the second mode.

6. The data processing apparatus according to claim 5, wherein the switching unit changes, when the communication unit is set in a third mode, the third mode into a modified third mode in which received data is transmitted to the other communication unit provided in the downstream direction along the ring without using the processing unit.

7. The data processing apparatus according to claim 1, wherein the processing unit stores, when the processing unit is not used for pipeline processing, setting information indicating that input data is not processed.

8. The data processing apparatus according to claim 1, wherein the communication unit comprises a storage unit configured to store data to be transferred, and
wherein when transfer of data is performed in the first mode, in a case where an enable signal sent from the first one of the communication units is invalid, the data to be transferred is stored in the storage unit.

9. A data processing apparatus in which a plurality of processing modules is connected in a ring via each of a bus and a signal line, and transfers data in a transfer direction along the ring to perform pipeline processing, each of the processing modules comprising:
a communication unit configured to receive data via the bus from an upstream direction along the ring and to transmit the received data in a downstream direction along the ring;
a processing unit connected one-to-one to the communication unit and configured to perform processing on data received from the communication unit;
a transmission control unit configured to transmit, in response to an enable signal sent from another communication unit on the signal line in an enable signal direction different from the transfer direction, the other communication unit being provided downstream from the communication unit in the downstream direction along the ring, data processed by the processing unit; and
a setting unit configured to set to the processing module, a first mode in which a precedent-stage processing module to be connected thereto via the signal line is informed of the enable signal, or a second mode in which the data is transmitted in the downstream direction along the ring by adding to the data the enable signal sent to the precedent-stage processing module.

10. The data processing apparatus according to claim 9, further comprising:
a control unit configured to compare a sequence in which the plurality of processing modules performs pipeline processing as a processing sequence, with a connection sequence of the plurality of processing modules, and to set in the setting unit information indicating whether the first mode or the second mode is employed.

11. A data processing method for use with a data processing apparatus in which a plurality of processing modules is connected in a ring via a bus and transfers data in a transfer direction along the ring to perform processing on the data, the data processing method comprising:
communicating including receiving data from an upstream direction along the ring via the bus by a communication unit and transmitting the data in a downstream direction along the ring; and
processing data received from the communication unit by a processing unit which is connected one-to-one to the communication unit thereof,
wherein, in the communicating, the transmitting of data received in the processing unit is controlled according to an enable signal sent from another communication unit on a signal line in an enable signal direction different from the transfer direction, the other communication unit being provided in the second downstream from the communication unit in the downstream direction along the ring.

12. A data processing method for use with a data processing apparatus in which a plurality of processing modules is connected in a ring via each of a bus and a signal line and transfers data in a transfer direction along the ring and perform pipeline processing, the data processing method comprising:
communicating including receiving data from an upstream direction of the ring via the bus by a communication unit and transmitting the data in a downstream direction along the ring;
processing data received from the communication unit by a processing unit connected one-to-one to the communication unit;
performing control to transmit, in response to an enable signal sent from the communication unit on a signal line in an enable signal direction different from the transfer direction, the communication unit being provided downstream from the communication unit in the downstream direction along the ring, data processed by the processing unit; and performing control to set a first mode in which a precedent-stage processing module to be connected thereto via the signal line is informed of the enable signal, or a second mode in which the data is transmitted in the downstream direction along the ring by adding to the data the enable signal to be sent to the precedent-stage processing module.

13. A non-transitory computer readable storage medium for storing a program causing a data processing apparatus, in which a plurality of processing modules is connected in a ring via a bus and transfers data in a transfer direction along the ring to perform processing on the data, to execute a data processing method, the method comprising:

communicating including receiving data from an upstream direction along the ring via the bus by a communication unit and transmitting the data in a downstream direction along the ring;

processing data received from the communication unit by a processing unit, which is connected one-to-one to the communication unit thereof, wherein, in the communicating, the transmitting of data received in the processing unit is controlled according to an enable signal sent from another communication unit on a signal line in an enable signal direction different from the transfer direction, the other communication unit being provided downstream from the communication unit in the downstream direction along the ring.

14. A non-transitory computer readable storage medium for storing a program causing a data processing apparatus, in which a plurality of processing modules is connected in a ring via each of a bus and a signal line and transfers data in a transfer direction along the ring to perform pipeline processing, to execute a data processing method, the method comprising:

communicating including receiving data from an upstream direction along the ring via the bus by a communication unit and transmitting the data in a downstream direction along the ring;

processing data received from the communication unit by a processing unit connected one-to-one to the communication unit;

performing control to transmit, in response to an enable signal sent from another communication unit on a signal line in an enable signal direction different from the transfer direction, the other communication unit being provided downstream from the communication unit in the downstream direction along the ring, data processed by the processing unit; and performing control to set a first mode in which a precedent-stage processing module to be connected thereto via the signal line is informed of the enable signal, or a second mode in which the data is transmitted in the downstream direction along the ring by adding to the data the enable signal to be sent to the precedent-stage processing module.

\* \* \* \* \*